United States Patent [19]

Thompson

[11] 4,231,174

[45] Nov. 4, 1980

[54] PROTECTIVE HOLDER FOR SHEET MATERIAL

[76] Inventor: Earl C. Thompson, Drawer A, Hewitt, Tex. 76643

[21] Appl. No.: 853,230

[22] Filed: Nov. 21, 1977

[51] Int. Cl.$^3$ .............................................. G09F 3/18
[52] U.S. Cl. ..................................... 40/10 A; 40/591
[58] Field of Search ............ 40/16, 10 A, 10 B, 10 D, 40/621, 617, 21

[56] References Cited

U.S. PATENT DOCUMENTS

| | | | |
|---|---|---|---|
| 1,482,695 | 2/1924 | Nelson | 40/10 R X |
| 1,563,139 | 11/1925 | Applas | 40/10 B |
| 1,854,861 | 4/1932 | Reeves | 40/10 B X |
| 1,910,751 | 5/1933 | Cobbs | 40/10 B |
| 2,176,708 | 10/1939 | Douglas | 40/10 X |
| 2,431,827 | 12/1947 | Rado | 40/621 |
| 2,732,642 | 1/1946 | Thompson | 40/13 |
| 2,893,147 | 7/1959 | Mollet | 40/617 |
| 3,309,805 | 3/1967 | Thomas | 40/617 |
| 3,826,026 | 7/1974 | Bevan | 40/10 B |

*Primary Examiner*—Gene Mancene
*Assistant Examiner*—Wenceslao J. Contreras

[57] ABSTRACT

A flat rectangular envelope has at least one wall which is transparent; the envelope in one form being fabricated from plastic film. Elongated mounting margins are formed along two side edges of the envelope, each having longitudinally spaced mounting apertures to enable the mounting of the envelope on a suitable support. The mounting apertures may be spaced to enable securing either edge of the envelope in a three-ring binder, or the envelope may be secured to other supports by means of ties. The mounting margins include some reinforcing means for improving the tear resistance of the mounting apertures. A plastic zipper is provided to close the top openable edge of the envelope. One wall may be formed from a magnetic material enabling the mounting of magnetic markers on the exterior of the transparent wall. The envelope may be secured to a rigid mounting board with coacting cords, which enable the envelope to be flip-flopped on the board without removal from the board.

13 Claims, 11 Drawing Figures

PROTECTIVE HOLDER FOR SHEET MATERIAL

BACKGROUND AND SUMMARY OF THE INVENTION

This invention relates to a protective holder for inscribed sheet material, to enable mounting of the sheet material for facile reading or observation.

An object of this invention is to provide a protective holder for sheet material, designed for mounting in a ring-type binder or, by means of ties, to other suitable supports.

Another object of this invention is to provide a holder for sheet material for displaying inscribed material at both faces and which is adapted for mounting in a ring-type binder with either face as the front face or side.

A further object of this invention is to provide a holder for sheet material having one transparent wall for displaying inscribed material, which transparent wall is adapted to receive temporary inscriptions on its exterior face.

Another object of this invention is to provide a holder for sheet material, provided with mounting apertures along two side edges to enable the mounting of the holder on a variety of suitable supports.

Still another object of this invention is to provide a holder for sheet material having a transparent wall for displaying the enclosed inscribed sheet material, and adapted to retain magnetic markers on the exterior face of the transparent wall.

A still further object of this invention is to provide a holder for sheet material which is adapted to be readily mounted on a vehicle steering wheel for display of maps or route lists.

Another object of this invention is to provide a holder for sheet material in combination with a rigid backing board, and mounted on the board to enable the holder to be flip-flopped for display of either face of the holder.

These objects are accomplished in a protective holder which comprises broadly a flat rectangular envelope having three closed edges and one open edge, with at least one wall of said envelope being fabricated from a transparent material. The envelope has elongated mounting margins at opposite sides thereof, each mounting margin having a plurality of longitudinally spaced mounting apertures. More particularly the mounting margins may have reinforcing means for improving the tear resistance of the mounting apertures, the transparent wall may be of a material enabling temporary inscription thereon, and the holder may include a back wall of magnetic material enabling the retaining of magnetic markers on the exterior surface of the transparent front wall.

The novel features and the advantages of the invention, as well as additional objects thereof, will be understood more fully from the following description when read in connection with the accompanying drawings.

DRAWINGS

DESCRIPTION OF THE PREFERRED EMBODIMENTS

Figure 1:
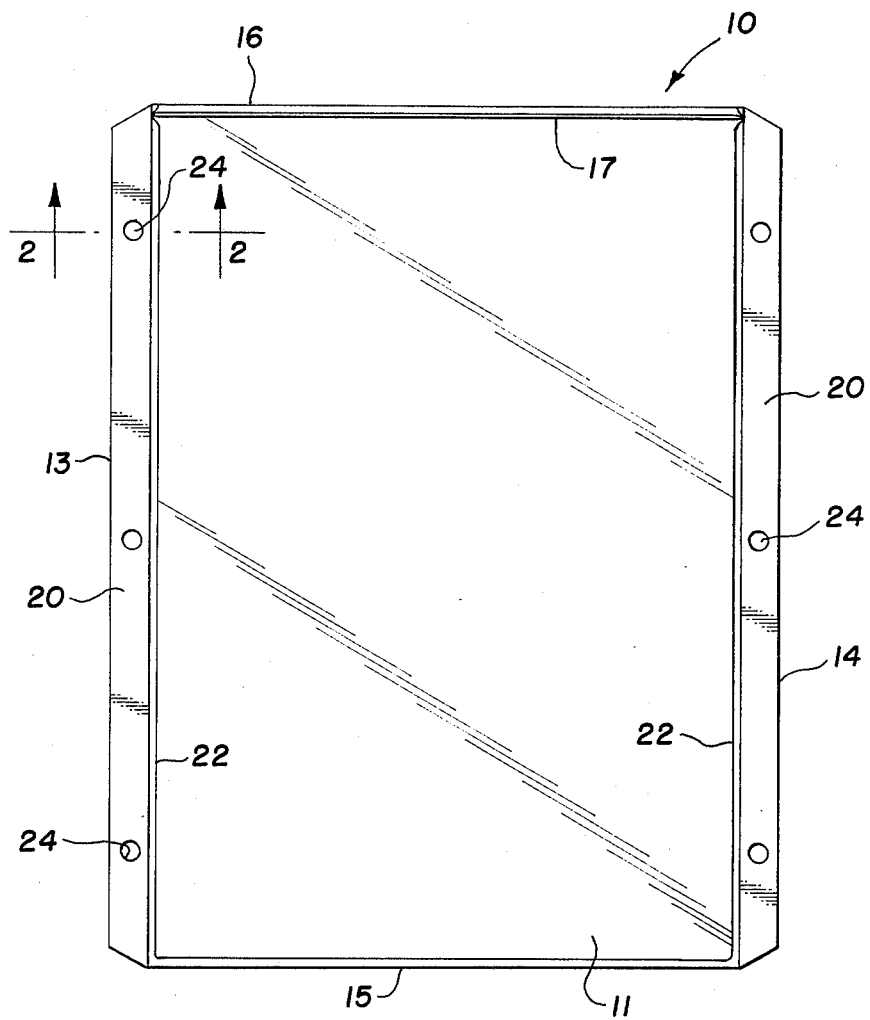
FIG. 1 is a front view of one form of protective holder according to the invention.
Figure 2:
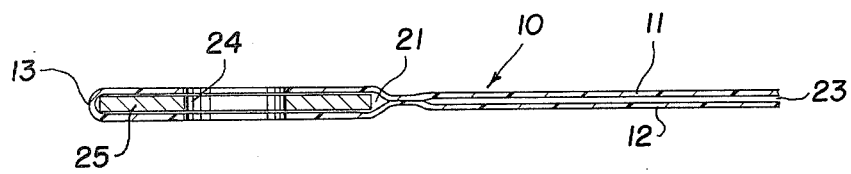
FIG. 2 is a partial transverse sectional view taken in the plane 2—2 of FIG. 1.

One form of protective holder according to the invention, as illustrated in FIGS. 1 and 2, consists of a flat rectangular envelope 10 fabricated from a transparent plastic film for example. This envelope includes front and back walls 11 and 12 closed or sealed at three edges, namely the side edges 13 and 14 and the bottom edge 15. The top edge 16 is the open edge for inserting and removing the inscribed sheet material; and this edge may be selectively closed by a conventional form of plastic zipper 17.

Identical elongated mounting margins 20 are formed at the side edges of the envelope 10, and these margins may be defined by separate elongated chambers 21 formed by heat sealed seams 22 which separate the margin chambers from a central storage chamber 23. Each mounting margin is provided with three mounting apertures 24, for example, and these may be longitudinally spaced to accommodate the spaced rings of a ring-type binder for example. Preferably the margin chambers 21 will enclose reinforcing strips 25 of any suitable material such as metal, plastic, or fiberboard, which strips function to reinforce or improve the tear resistance of the mounting apertures.

The above described holder 10 then is completely reversible, with reference to a ring-type binder, in the sense that the holder may be mounted in that binder with either the front wall 11 or the back wall 12 appearing as the front side of the page when so mounted. With both walls being transparent, inscribed material may be enclosed within the envelope to be displayed through both the front and back walls; and in the presentation of such material in the ring binder, the user may, as he wishes, present either face of the holder as the front side of the page. Should he desire to present the opposite side as the front side of the page in the binder, he may do so merely by reversing the envelope without removing the inscribed material from the envelope.

Figure 3:
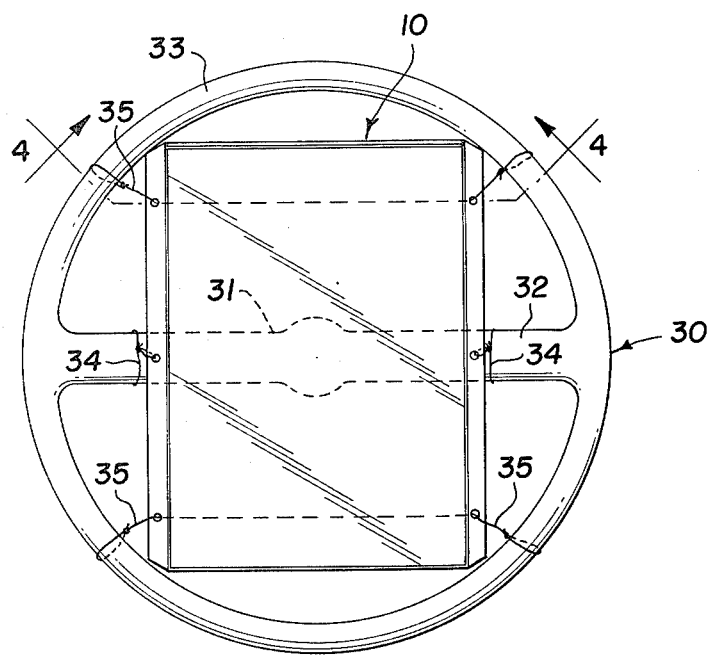
FIG. 3 is a front view of the protective holder of FIG. 1 secured to a vehicle steering wheel by means of suitable ties.

In FIG. 3 of the drawing, the protective holder 10 is shown mounted on the steering wheel 30 of a vehicle such as a passenger vehicle or a delivery vehicle. The steering wheel includes a hub 31, a normally horizontal cross bar 32 and a wheel ring 33. As seen the protective holder 10 is secured to the steering wheel by means of ties 34 passing through the center mounting apertures 24 and tied around the wheel cross bar 32, and additional ties 35 passing through the end mounting apertures and secured to the wheel ring 33. These ties 34 and 35 may have the form of shoestring type ties for example. By means of these ties the protective holder is readily secured to or removed from the steering wheel as described.

Figure 4:
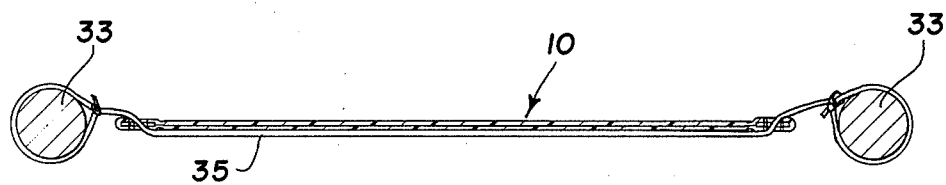
FIG. 4 is a detail view taken along the line 4—4 of FIG. 3.

FIGS. 3 and 4 illustrate a particular arrangement for securing and supporting the top and bottom ends of the holder 10 on the steering wheel. For this purpose, each of the ties 35 is an elongated strand (such as a shoestring) which passes through the mounting apertures 24 at adjacent corners, and traverses the holder 10 at the exterior face of the back wall 12, with the ends of the strand 35 extending from the front face of the holder through the mounting apertures a sufficient distance to be tied to the steering wheel ring 33. With the tie tied to the ring in a manner that it is relatively taut, the tie provides a support or backing to resist inward or downward movement of the holder resulting from the user inscribing some marking on the front face of the holder. If desired, such tie 35 may be tied to the holder at the mounting apertures 24, to further restrain the holder against movement relative to the steering wheel and also to prevent misplacement of the tie 35 when the holder is removed from the wheel.

It should be mentioned that the page protector and/or the ties by which it is secured to the vehicle steering wheel are designed, preferably, in a manner that the holder will be readily displaced from the steering wheel so as not to interfere with the operation of the proposed safety airbags for vehicles which are mounted in the hub portion of the vehicle steering wheel.

Figure 5:
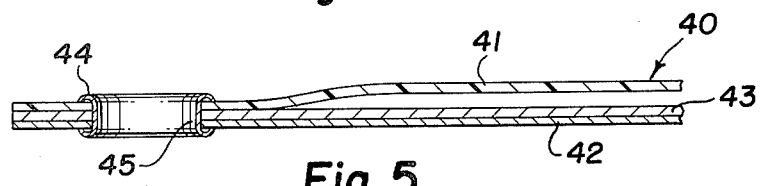
FIG. 5 is a partial transverse sectional view, similar to FIG. 2, illustrating an alternative form of protective holder according to the invention.

An alternative form of holder 40 according to the invention is illustrated by the partial transverse sectional view of FIG. 5. The holder 40 is again a flat rectangular envelope, generally similar in construction to the holder 10, and including a front wall 41 of a transparent plastic film for example, an outer back protective wall 42 of any suitable material which may be either flexible or rigid, and an inner back wall 43 fabricated from a magnetic material which may be either rigid or flexible. If desired the walls 42 and 43 may be combined as a single back wall member of a magnetic material. With the wall construction of the holder 40, the inscribed material is displayed through the transparent front wall 41; and magnetic markers may be placed on the front wall in desired relation to the displayed material, and will be retained in place through coaction with the magnetic inner wall 43. In this alternative form of holder 40, the mounting margins are not formed as discrete chambers separate from the central storage chamber, but are formed by grommets 44 passing through and securing the three walls together and defining the mounting apertures 45. These grommets may have the form of metallic rivets for example. It may be desirable that some form of cement be used, in addition to the grommets 44, to seal the side edges of the holder against entry of foreign material.

Figure 6:
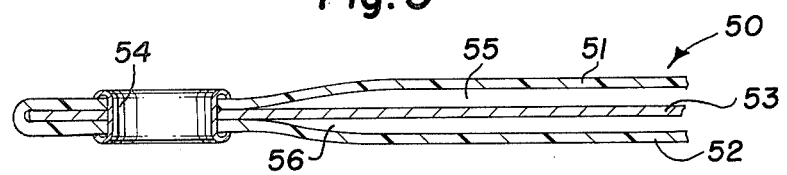
FIG. 6 is a partial transverse sectional view, similar to FIG. 5, illustrating still another alternative form of protective holder according to the invention.

Still another alternative form of holder 50 according to the invention is illustrated in the partial transverse sectional view, FIG. 6. The holder 50 is again a flat rectangular envelope, but having two back-to-back storage chambers or pockets for inscribed material, which are defined by two outer walls 51 and 52 fabricated from a transparent plastic material for example and an intermediate wall 53. The intermediate wall 53 is generally coextensive with the outer walls; and the mounting margins are formed in the same manner as those of the holder 40, with the mounting apertures being formed through the three walls, and grommets 54 being passed through the mounting apertures to reinforce these mounting apertures and also to secure the three sheets together at the mounting margins. Desirably some form of cement should be used in addition along the mounting margins to seal these edges of the holder.

Desirably an opening adjacent to the top edge of one wall 51 or 52 is provided with a slit opening and may include a conventional plastic zipper as above described. This holder provides two back-to-back pockets 55 and 56 on opposite sides of the intermediate wall 52; and to enable the insertion and removal of inscribed material to and from either pocket, the upper edge of the intermediate wall would be spaced from the upper edges of the outer walls 51 and 52. The provision of the intermediate wall 53 may desirably provide an opaque backing for inscribed material inserted in either of the pockets 55 or 56; or alternatively, the intermediate wall may be either fabricated from or include magnetic material to enable the placing of magnetic markers on the exterior faces of either outer wall, which markers will then be magnetically held against these exterior faces. As with other described embodiments of the invention, this holder is completely reversible so that either wall 51 or 52 may serve as a front wall in the selected use of the holder.

If desired the transparent walls of the above described holders may be fabricated from a material which enables the making of additional inscriptions on the exterior faces of these transparent walls by means of suitable marking media such as a lead pencil or writing ink. The wall material is such that it will retain the inscription in desired relation with the inscribed sheet within the holder, and that the inscriptions placed on the exterior wall face may be readily removed when desired such as by wiping with a dampened cloth or towel.

For use of the holders 10 or 40 with a vehicle, it will be preferable that the transparent walls be fabricated from a material having nonglare characteristics to minimize the possibility of glare distractions to the driver of the vehicle.

Figure 7:
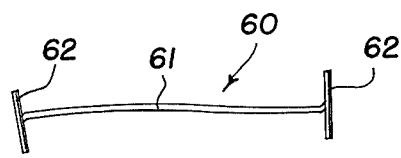
FIG. 7 is a view of an alternative form of tie for securing a protective holder to a vehicle steering wheel or other support.

FIG. 7 of the drawing illustrates another form of tie which might be supplied with a holder according to the invention, and which will be retained with the holder when it is not secured to a vehicle steering wheel for example. This tie 60 preferably consists of an elongated elastic shank 61 having rigid T-bars 62 pivotally attached to the ends of the shank, which T-bars have a length exceeding the diameter of the mounting apertures. These elastic ties may be readily secured around a support such as the steering wheel ring with the T-bars being passed through the mounting apertures and retained therein.

EMBODIMENT OF FIGS. 8 THROUGH 11

FIGS. 8 through 11 illustrate the protective holder 10, described above with reference to FIGS. 1 through 4, in combination with a different type of support. In this combination, the holder 10 is mounted on a relatively rigid backing board 70; and is secured to the board by means of a plurality of cords 75, 76 and 77, which enable the flexible holder to be flip-flopped—or turned over on the board without removing the holder from the board. This combination is particularly useful in outdoor situations where the holder and board are exposed to wind, for example; and the board 70 may preferably have some significant mass to minimize movement in the wind. As illustrated, the board 70 includes a hanging aperture 71 to enable the hanging of the board by means of a nail or hook. The board may be fabricated from any suitable material such as plywood, fiberboard, sheet metal, or sheet plastic.

Figure 10:
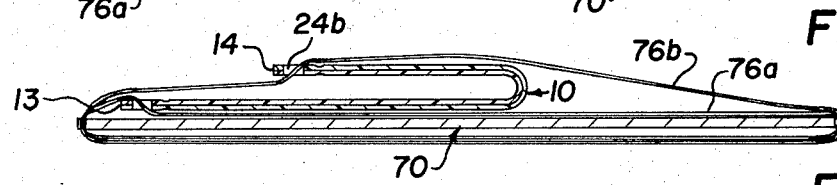
Figure 11:
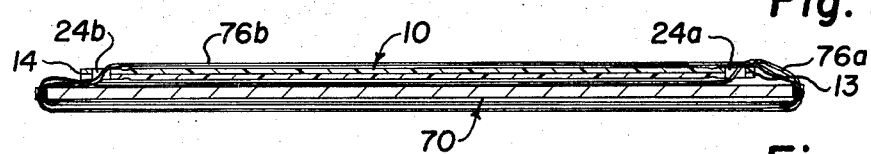

The holder is secured to the board by means of three pairs of cords 75a and 75b, 76a and 76b, and 77a and 77b. These cords may be woven cords or string, or may be partially or fully elastic strings or bands. The cords are illustrated as bands completely encircling the board 70, and are supported and retained in longitudinally spaced relation by means of pairs of edge notches 72, 73 and 74 which retain the cord pairs 75, 76 and 77 respectively. FIGS. 9, 10 and 11 are sectional views, taken in the plane 9—9 of FIG. 8, illustrating the manner of flipping the holder 10 on the board 70.

In describing this embodiment, reference will be made to the mounting margins 20a and 20b which are associated with the respective edges 13 and 14 of the holder 10. Similarly reference will be made to the mounting apertures 24a and 24b which are provided in the mounting margins 20a and 20b respectively. Each cord pair coacts with a respective aperture pair including an aperture 24a and an aperture 23b. For each cord pair which secures the holder 10 to the board 70, the cords designated a are the cords which pass through the mounting apertures 24a, and the cords designated b are the cords which pass through the apertures 24b. Through the use of these subscripts a and b, then, the relationships of the parts will be readily understood.

Figure 8:
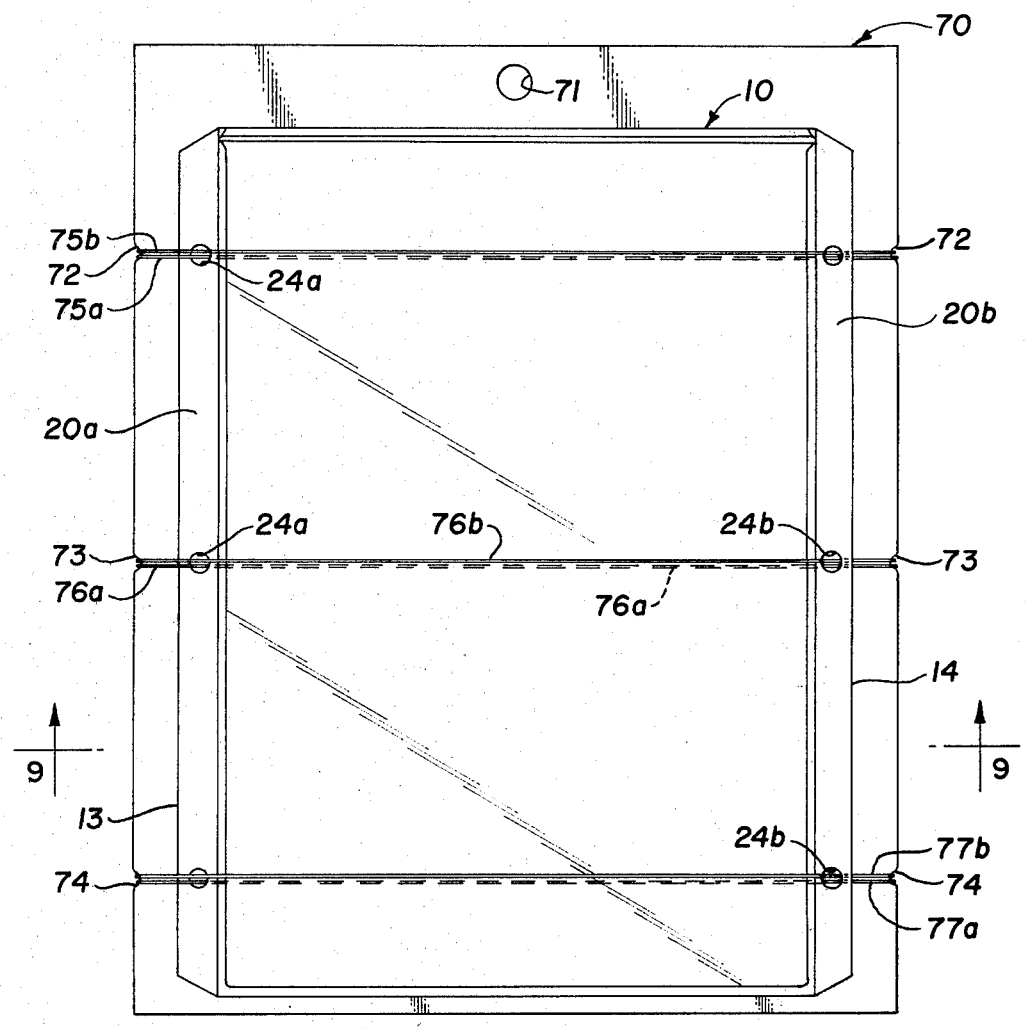
FIG. 8 is a front view of a protective holder in combination with a particular mounting board.
Figure 9:
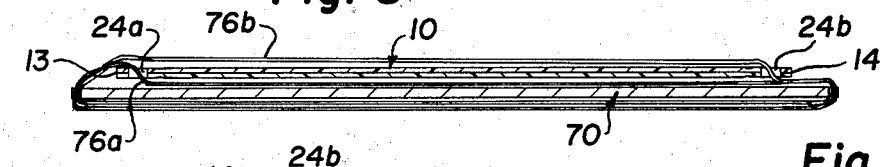
FIGS. 9, 10 and 11 are transverse sectional views, taken in the plane 9—9 of FIG. 8, illustrating several conditions of the holder-board combination.

FIGS. 8 and 9 illustrate an initial condition wherein the holder edge 13 is adjacent the left hand edge of the board 70, and the holder edge 14 is adjacent to the right hand edge of the board 70. It will be appreciated that each pair of cords 75, 76 and 77 functions identically in relation to the respective mounting apertures; and FIGS. 9, 10 and 11, of course, illustrate the relationships of the cord pair 76 only.

In the initial condition illustrated in FIGS. 8 and 9, the cord 76a, as it passes over the top face of the board 70 from left to right, passes downwardly through the mounting aperture 24a and under the holder 10, thereby underlying a substantial portion of the holder 10. The cord 76b on the other hand, as it passes over the board top face from left to right, overlies a substantial portion of the holder 10 and passes downwardly through the mounting aperture 24b adjacent to the right hand edge of the board 70.

To flip the holder relative to the board the right hand edge 14 of the holder is folded over toward the left hand edge of the board 70 as illustrated in FIG. 10; and it will be seen that the coaction of the cord 76b (and corresponding cords 75b and 77b) and their respective mounting apertures allow this manipulation.

The flip-flop is completed when the edge 14 of the holder is moved adjacent to the left hand edge of the board 70, and the holder edge 13 is then manipulated to assume its position on the right hand side of the board as illustrated in FIG. 11. For subsequent flip-flop, the edge 14 would again be grasped first and folded over toward the right to return the holder to the originally illustrated position.

It will be seen that the cords need only be slightly elastic to permit the above described flip-flop maneuvers; and the holder 10 is always very securely mounted or retained on the board 70 to obviate any chance that the holder will be lost or removed from the backing board 70. The holder is always retained in a flat condition relative to the board, by the cords 75b, 76b and 77b, to enable easy reading of the inscribed material even in conditions of substantial wind which would cause difficulty were the material mounted on a clipboard for example.

While in the above described embodiment, the cords are illustrated and described as completely encircling the board 70 and retained in position by the respective notches, it will be appreciated that the cords could be secured to the board edges in a manner that the cords merely pass across the front face of the board.

With the above described mounting, two pages of sequential information can be placed in a single holder 10 for presentation in sequence. It will be appreciated that a similar holder 10 may be supported on the back face of the same board 70 in the same manner; and this would enable the placing of four pages of information on a single backing board 70 in a manner to be presented sequentially.

What has been described is a novel and unique form of protective holder for inscribed sheet material which is adapted for multiple uses, and multiple forms of mounting. The holder is particularly adapted to be supported on a vehicle steering wheel by means of ties, for supporting road maps, route maps, or route lists. For this use, a particular feature of the invention would be the ability of its display face to retain temporary inscriptions such as marking by a lead pencil or writing ink, to provide for ready noting of an upcoming intersection, address, etc. Similarly, where the protective holder is provided with magnetic markers as above described, such markers may be used to advantage in connection with route maps or route lists for delivery vehicle situations. An ancillary feature is the manner of utilizing the steering wheel ties as a support backing of the holder.

Another particular feature of the invention is the provision of mounting margins on both side edges of the holder enabling, very readily, use of the holder in ring type binders as described. This is of particular advantage where in the presentation of material in such binder it may be desired in one situation to present one face of the holder as the front side of a page; and in another situation to present the material exposed from the other face of the holder as the front side of the page in the ring binder.

Another particular feature and advantage of the invention is the combination of the holder with a backing board, and the securing of the holder to the backing board by cords such that the holder may be flip-flopped on the board without removal from the board, and yet be securely retained on the board at all times.

While preferred embodiments of the invention have been illustrated and described, it will be understood by those skilled in the art that changes and modifications may be resorted to without departing from the spirit and scope of the invention.

What is claimed is:

1. In combination with a support member, a protective holder for sheet material comprising
a flat rectangular envelope having three closed edges and one open edge; at least one wall of said envelope being fabricated from a transparent material;
said envelope having elongated mounting margins at opposite side edges thereof; said mounting margins each having a plurality of longitudinally spaced mounting apertures;

said mounting apertures including two spaced pairs, each pair including apertures adjacent to adjacent corners thereof;

tie means for securing said envelope to said support member, including a plurality of support cords mounted on said member in parallel relation to each other;

said envelope disposed in generally overlying relation to said member, with each aperture pair disposed for coacting relation with a respective cord pair; one cord of each cord pair passing through one mounting aperture of a respective aperture paid and overlying one face of said envelope, in the same manner; and the other cord of each cord pair passing through the other mounting aperture of a respective aperture paid and overlying the other face of said envelope, in the same manner; said cord pairs and said envelope aperture pairs coacting to enable said envelope to be flip-flopped relative to said support member and to said support cords.

2. The combination set forth in claim 1 said support member comprising a backing board.

3. The combination set forth in claim 2
each of said cords being secured to said board to encircle said board, and to overlie both faces of said board.

4. The combination set forth in claim 1
each of said cords being at least slightly elastic.

5. The combination set forth in claim 1
said support member comprising a vehicle steering wheel;
said support cords traversing the front face of said steering wheel.

6. The combination set forth in claim 1
including zipper means for closing said open edge.

7. The combination set forth in claim 6
wherein said envelope is fabricated from a plastic film, and wherein said zipper means is a plastic zipper.

8. The combination set forth in claim 1
said transparent wall being fabricated from a non-glare material.

9. The combination set forth in claim 1
said envelope being fabricated from transparent plastic sheet material; said mounting margins being formed integrally with said envelope and defining elongated edge chambers separate from a central storage chamber; and strips of reinforcing material enclosed within said mounting margin chambers for strengthening said mounting apertures.

10. The combination set forth in claim 1
said envelope having one wall including magnetic material, thereby enabling magnet markers to be positioned and held in place on the exterior face of said transparent wall.

11. The combination set forth in claim 1
including grommet means passing through said mounting margins and defining reinforced mounting apertures.

12. The combination set forth in claim 1
at least one transparent wall of said envelope having an exterior surface capable of receiving temporary inscriptions with a suitable inscribing medium.

13. A protective holder for sheet material comprising a flat rectangular envelope having three closed edges and one open edge;

said envelope having two transparent outer walls and an intermediate wall defining back-to-back storage chambers; said intermediate wall including magnetic material enabling magnetic markers to be positioned and magnetically held in place on the exterior faces of both of said transparent walls;

said envelope having elongated mounting margins at opposite side edges thereof; said mounting margins each having a plurality of longitudinally spaced mounting apertures.

* * * * *

UNITED STATES PATENT AND TRADEMARK OFFICE
CERTIFICATE OF CORRECTION

PATENT NO. : 4,231,174
DATED : November 4, 1980
INVENTOR(S) : Earl C. Thompson

It is certified that error appears in the above-identified patent and that said Letters Patent are hereby corrected as shown below:

Column 3, line 5 change "described" to --desired--;

Column 5, line 25 change "23b" to --24b--;

Column 7, line 16 [actual line 16] change "paid" to --pair--.

Signed and Sealed this

Nineteenth Day of January 1982

[SEAL]

Attest:

*Attesting Officer*

GERALD J. MOSSINGHOFF
*Commissioner of Patents and Trademarks*